(12) United States Patent
Crothers et al.

(10) Patent No.: US 8,966,909 B2
(45) Date of Patent: Mar. 3, 2015

(54) SYSTEM FOR REDUCING COMBUSTION DYNAMICS

(75) Inventors: Sarah Lori Crothers, Greenville, SC (US); Gilbert Otto Kraemer, Greer, SC (US)

(73) Assignee: General Electric Company, Schenectady, NY (US)

(*) Notice: Subject to any disclaimer, the term of this patent is extended or adjusted under 35 U.S.C. 154(b) by 520 days.

(21) Appl. No.: 13/590,302

(22) Filed: Aug. 21, 2012

(65) Prior Publication Data

US 2014/0245738 A1 Sep. 4, 2014

(51) Int. Cl.
*F23R 3/32* (2006.01)
*F02C 7/24* (2006.01)
*F02C 7/228* (2006.01)
*F23R 3/18* (2006.01)
*F23R 3/42* (2006.01)

(52) U.S. Cl.
CPC . *F02C 7/24* (2013.01); *F02C 7/228* (2013.01); *F23R 3/18* (2013.01); *F23R 3/42* (2013.01)
USPC ............... 60/742; 239/419; 239/423; 60/746; 60/725; 60/737

(58) Field of Classification Search
CPC ............ F23R 2900/00013; F23R 2900/00014; F05B 2260/96; F05B 2260/964; F23D 2210/00; F23D 2210/101
USPC ........ 60/725, 737, 740, 742, 746, 748, 39.37, 60/39.77
See application file for complete search history.

(56) References Cited

U.S. PATENT DOCUMENTS

| 5,943,866 | A | 8/1999 | Lovett et al. | |
|---|---|---|---|---|
| 6,164,055 | A * | 12/2000 | Lovett et al. | 60/776 |
| 7,578,130 | B1 | 8/2009 | Kraemer et al. | |
| 8,408,004 | B2 * | 4/2013 | Davis et al. | 60/772 |
| 2014/0033718 | A1 * | 2/2014 | Manoharan et al. | 60/725 |

* cited by examiner

*Primary Examiner* — Phutthiwat Wongwian
*Assistant Examiner* — Marc J Amar
(74) *Attorney, Agent, or Firm* — Dority & Manning, PA

(57) ABSTRACT

A system and method for reducing combustion dynamics includes first and second combustors arranged about an axis, and each combustor includes a plurality of tubes that extend axially through at least a portion of the combustor and a combustion chamber downstream from the plurality of tubes. A fuel injector extends through each tube to provide fluid communication into each tube at a fourth axial distance from the combustion chamber. The fourth axial distance in the first combustor is different than the fourth axial distance in the second combustor.

20 Claims, 12 Drawing Sheets

SYSTEM FOR REDUCING COMBUSTION DYNAMICS

FIELD OF THE INVENTION

The present invention generally involves a system and method for reducing combustion dynamics. In particular embodiments, the invention may be incorporated into a gas turbine or other turbo-machine.

BACKGROUND OF THE INVENTION

Combustors are commonly used in industrial and commercial operations to ignite fuel to produce combustion gases having a high temperature and pressure. For example, gas turbines and other turbo-machines typically include one or more combustors to generate power or thrust. A typical gas turbine used to generate electrical power includes an axial compressor at the front, multiple combustors around the middle, and a turbine at the rear. Ambient air enters the compressor as a working fluid, and the compressor progressively imparts kinetic energy to the working fluid to produce a compressed working fluid at a highly energized state. The compressed working fluid exits the compressor and flows through one or more fuel nozzles and/or tubes in the combustors where the compressed working fluid mixes with fuel before igniting to generate combustion gases having a high temperature and pressure. The combustion gases flow to the turbine where they expand to produce work. For example, expansion of the combustion gases in the turbine may rotate a shaft connected to a generator to produce electricity.

Various factors influence the design and operation of the combustors. For example, higher combustion gas temperatures generally improve the thermodynamic efficiency of the combustors. However, higher combustion gas temperatures also promote flame holding conditions in which the combustion flame migrates toward the fuel being supplied by the fuel nozzles, possibly causing accelerated wear to the fuel nozzles in a relatively short amount of time. In addition, higher combustion gas temperatures generally increase the disassociation rate of diatomic nitrogen, increasing the production of nitrogen oxides ($NO_x$). Conversely, a lower combustion gas temperature associated with reduced fuel flow and/or part load operation (turndown) generally reduces the chemical reaction rates of the combustion gases, increasing the production of carbon monoxide and unburned hydrocarbons.

Although effective at enabling higher operating temperatures while protecting against flame holding and controlling undesirable emissions, at particular operating conditions, some combustors may produce combustion instabilities that result from an interaction or coupling of the combustion process or flame dynamics with one or more acoustic resonant frequencies of the combustor. For example, one mechanism of combustion instabilities may occur when the acoustic pressure pulsations cause a mass flow fluctuation at a fuel port which then results in a fuel-air ratio fluctuation in the flame zone. When the resulting fuel/air ratio fluctuation and the acoustic pressure pulsations have a certain phase behavior (e.g., approximately in-phase), a self-excited feedback loop results. This mechanism, and the resulting magnitude of the combustion dynamics, depends on the delay time between the injection of the fuel and the time when it reaches the flame zone, known in the art as convective time (Tau). As the convective time increases, the frequency of the combustion instabilities decreases, and when the convective time decreases, the frequency of the combustion instabilities increases. The result is combustion dynamics that may reduce the useful life of one or more combustor and/or downstream components. For example, the combustion dynamics may produce pressure pulses inside the fuel nozzles and/or combustion chambers that may adversely affect the high cycle fatigue life of these components, the stability of the combustion flame, the design margins for flame holding, and/or undesirable emissions. Alternately, or in addition, combustion dynamics at specific frequencies and with sufficient amplitudes, that are in-phase and coherent, may produce undesirable sympathetic vibrations in the turbine and/or other downstream components. By shifting the frequency of the combustion instability in one or more combustors away from the others, the coherence of the combustion system as a whole will be reduced, and the combustor-to-combustor coupling will be diminished. This reduces the ability of the combustor tone to cause a vibratory response in downstream components and also encourages destructive interference from combustor-to-combustor, reducing combustion dynamics amplitudes. Therefore, a system and method that adjusts the phase and/or coherence of the combustion dynamics produced by each combustor would be useful to enhancing the thermodynamic efficiency of the combustors, protecting against accelerated wear, promoting flame stability, and/or reducing undesirable emissions over a wide range of operating levels.

BRIEF DESCRIPTION OF THE INVENTION

Aspects and advantages of the invention are set forth below in the following description, or may be obvious from the description, or may be learned through practice of the invention.

One embodiment of the present invention is a system for reducing combustion dynamics that includes first and second combustors arranged about an axis, and each combustor includes a plurality of tubes that extend axially through at least a portion of the combustor and a combustion chamber downstream from the plurality of tubes. A fuel injector extends through each tube to provide fluid communication into each tube at a fourth axial distance from the combustion chamber. The fourth axial distance in the first combustor is different than the fourth axial distance in the second combustor.

Another embodiment of the present invention is a system for reducing combustion dynamics that includes first and second combustors arranged about an axis, and each combustor includes a cap assembly that extends radially across at least a portion of the combustor and a combustion chamber downstream from the cap assembly. Each cap assembly includes a plurality of tubes that extend axially through the cap assembly to provide fluid communication through the cap assembly to the combustion chamber and a fuel injector that extends through each tube to provide fluid communication into each tube at a fourth axial distance from the combustion chamber. The fourth axial distance in the first combustor is different than the fourth axial distance in the second combustor.

In yet another embodiment of the present invention, a system for reducing combustion dynamics includes first and second combustors arranged about an axis, and each combustor includes a plurality of tubes that extend axially through at least a portion of the combustor and a combustion chamber downstream from the plurality of tubes. A fuel injector extends through each tube to provide fluid communication into each tube at a fourth axial distance from the combustion chamber. The system further includes structure for producing a combustion instability frequency in the first combustor that is different from the combustion instability frequency in the second combustor.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
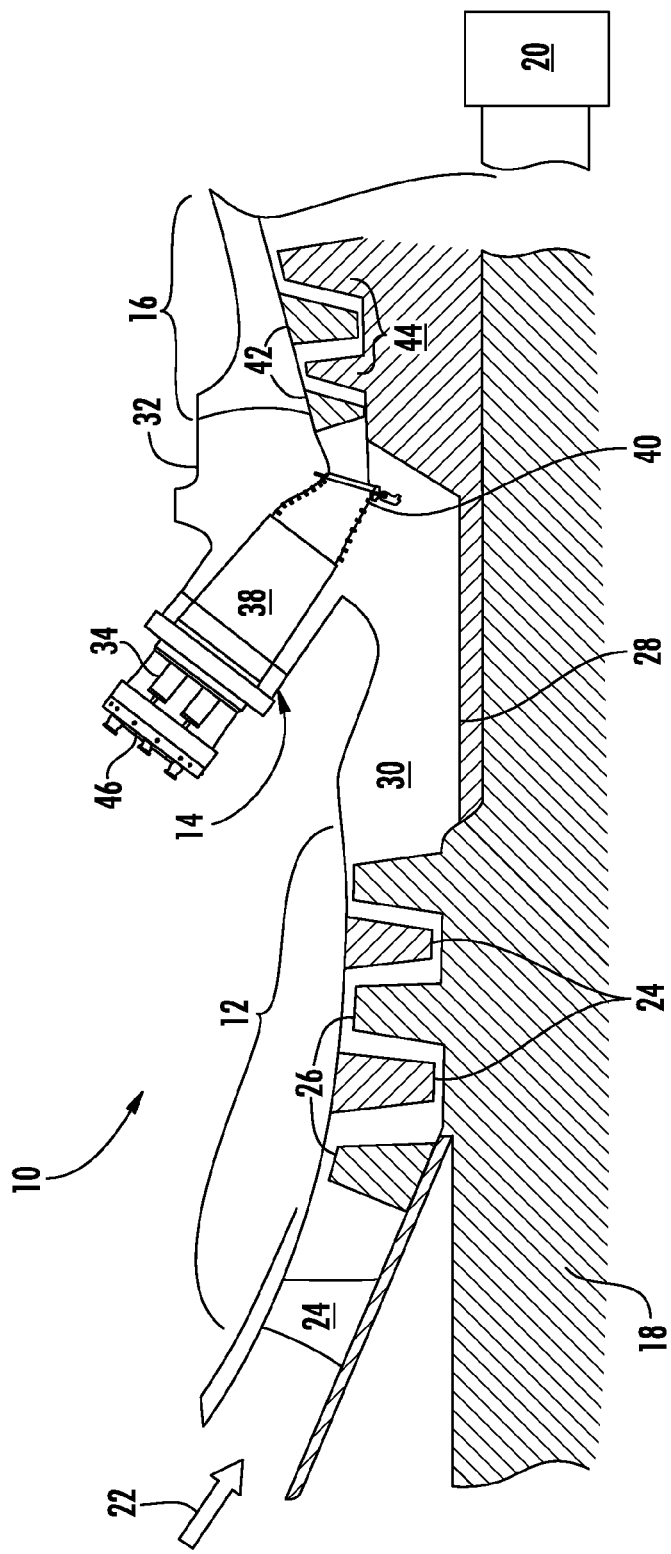
FIG. 1 is a simplified side cross-section view of an exemplary gas turbine according to various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a system and method for reducing combustion dynamics to enhance thermodynamic efficiency, promote flame stability, and/or reduce undesirable emissions over a wide range of operating levels. The system and method generally include multiple combustors, and each combustor includes one or more fuel nozzles and/or tubes and a combustion chamber downstream from the fuel nozzle(s) and/or tubes. Each fuel nozzle includes one or more fuel ports and/or radially extending vanes, and each tube includes one or more fuel injectors. The system and method include various means for producing a combustion instability frequency in the first combustor that is different from the combustion instability frequency in the second combustor. As a result, various embodiments of the present invention may result in extended operating conditions, extended life and/or maintenance intervals, improved design margins of flame holding, and/or reduced undesirable emissions. Although exemplary embodiments of the present invention will be described generally in the context of combustion dynamics in a gas turbine for purposes of illustration, one of ordinary skill in the art will readily appreciate that embodiments of the present invention may be applied to any combustion dynamics and are not limited to a gas turbine unless specifically recited in the claims.

FIG. 1 provides a simplified cross-section view of an exemplary gas turbine 10 that may incorporate various embodiments of the present invention. As shown, the gas turbine 10 may generally include a compressor section 12 at the front, multiple combustors 14 radially disposed in a combustion section around the middle, and a turbine section 16 at the rear. The compressor section 12 and the turbine section 16 may share a common rotor 18 connected to a generator 20 to produce electricity. A working fluid 22, such as ambient air, may enter the compressor section 12 and pass through alternating stages of stationary vanes 24 and rotating blades 26. A compressor casing 28 contains the working fluid 22 as the stationary vanes 24 and rotating blades 26 accelerate and redirect the working fluid 22 to produce a continuous flow of compressed working fluid 22. The majority of the compressed working fluid 22 flows through a compressor discharge plenum 30 to the combustors 14. A combustor casing 32 may circumferentially surround some or all of each combustor 14 to contain the compressed working fluid 22 flowing from the compressor section 12. Fuel may be mixed with the compressed working fluid 22 in one or more fuel nozzles 34 and/or tubes 36. Possible fuels include, for example, one or more of blast furnace gas, coke oven gas, natural gas, vaporized liquefied natural gas (LNG), hydrogen, and propane. The mixture of fuel and compressed working fluid 22 may then flow into a combustion chamber 38 where it ignites to generate combustion gases having a high temperature and pressure. A transition duct 40 circumferentially surrounds at least a portion of the combustion chamber 38, and the combustion gases flow through the transition duct 40 to the turbine section 16.

The turbine section 16 may include alternating stages of stationary nozzles 42 and rotating buckets 44. The stationary nozzles 42 redirect the combustion gases onto the next stage of rotating buckets 44, and the combustion gases expand as they pass over the rotating buckets 44, causing the rotating buckets 44 and rotor 18 to rotate. The combustion gases then flow to the next stage of stationary nozzles 42 which redirect the combustion gases to the next stage of rotating buckets 44, and the process repeats for the following stages.

Figure 2:
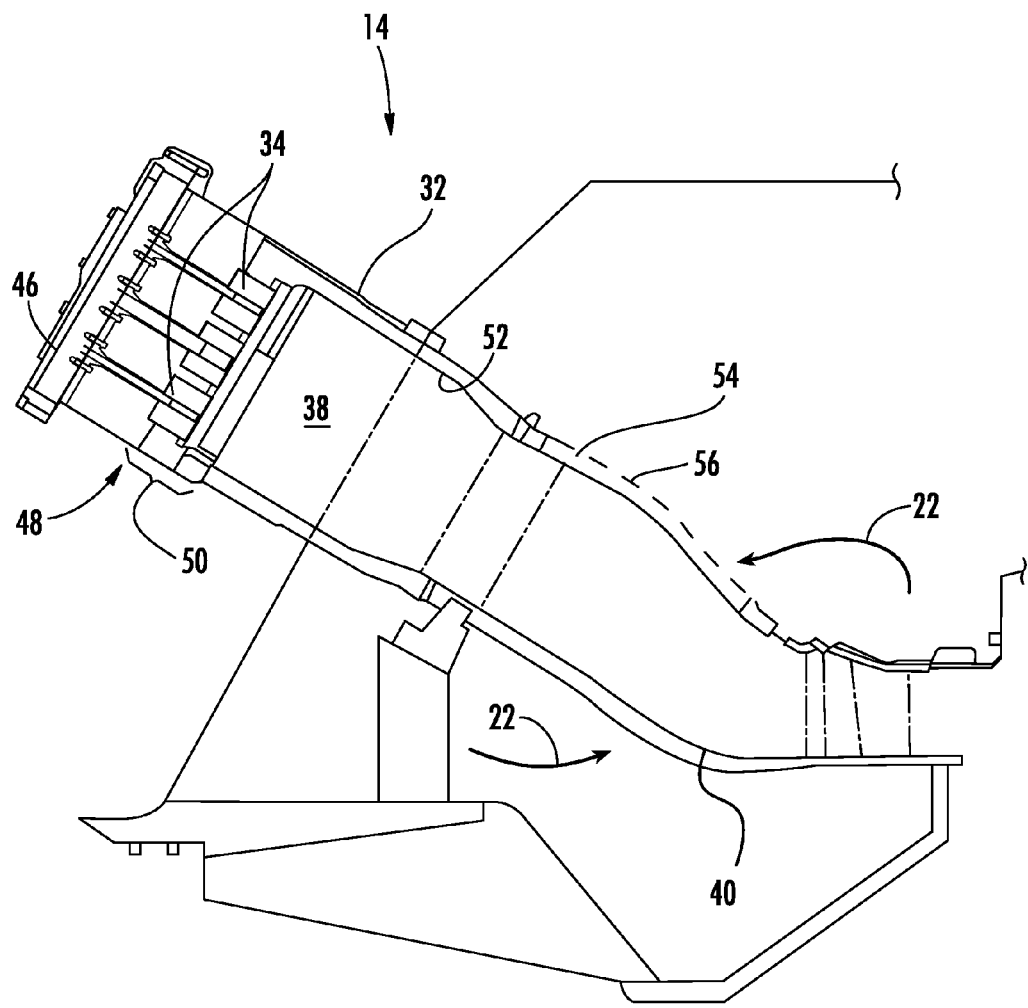
FIG. 2 is a simplified side cross-section view of an exemplary combustor according to various embodiments of the present invention.

The combustors 14 may be any type of combustor known in the art, and the present invention is not limited to any particular combustor design unless specifically recited in the claims. FIG. 2 provides a simplified side cross-section view of an exemplary combustor 14 according to various embodiments of the present invention. The combustor casing 32 circumferentially surrounds at least a portion of the combustor 14 to contain the compressed working fluid 22 flowing from the compressor 12. As shown in FIG. 2, the combustor casing 32 may be connected to or include an end cover 46 that extends radially across at least a portion of each combustor 14 to provide an interface for supplying fuel, diluent, and/or other additives to each combustor 14. In addition, the combustor casing 32 and end cover 46 may combine to at least partially define a head end 48 inside each combustor 14. The fuel nozzles 34 and/or tubes 36 may be radially arranged in a cap assembly 50 that extends radially across at least a portion of each combustor 14 downstream from the head end 48. A liner 52 may be connected to the cap assembly 50 to at least partially define the combustion chamber 38 downstream from the cap assembly 50. In this manner, the working fluid 22 may flow, for example, through flow holes 54 in an impingement sleeve 56 and along the outside of the transition duct 40 and liner 52 to provide convective cooling to the transition duct 40 and liner 52. When the working fluid 22 reaches the head end 48, the working fluid 22 reverses direction, and the fuel nozzles 34 and/or tubes 36 provide fluid communication for the working fluid 22 to flow through the cap assembly 50 and into the combustion chamber 38.

Figure 3:
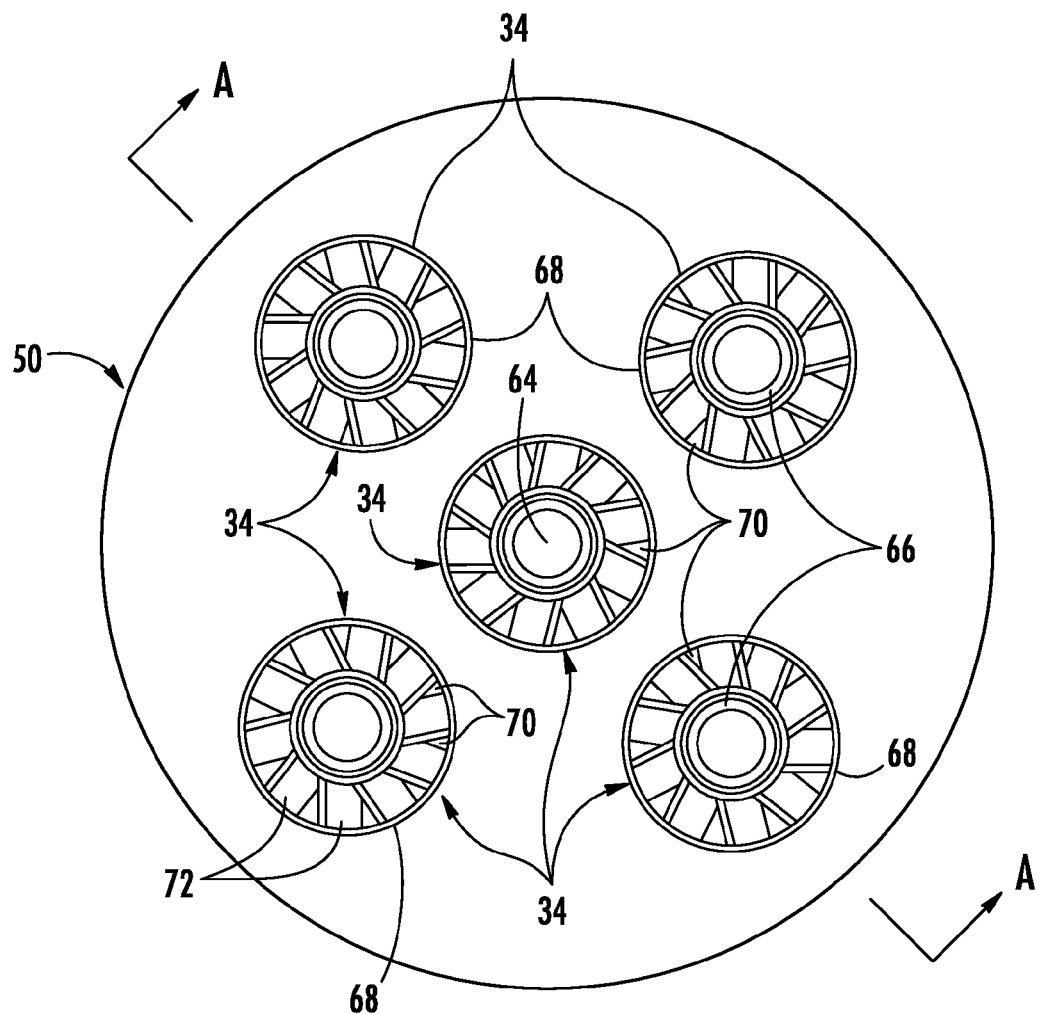
FIG. 3 is an upstream plan view of the cap assembly shown in FIG. 2 according to an embodiment of the present invention.
Figure 4:
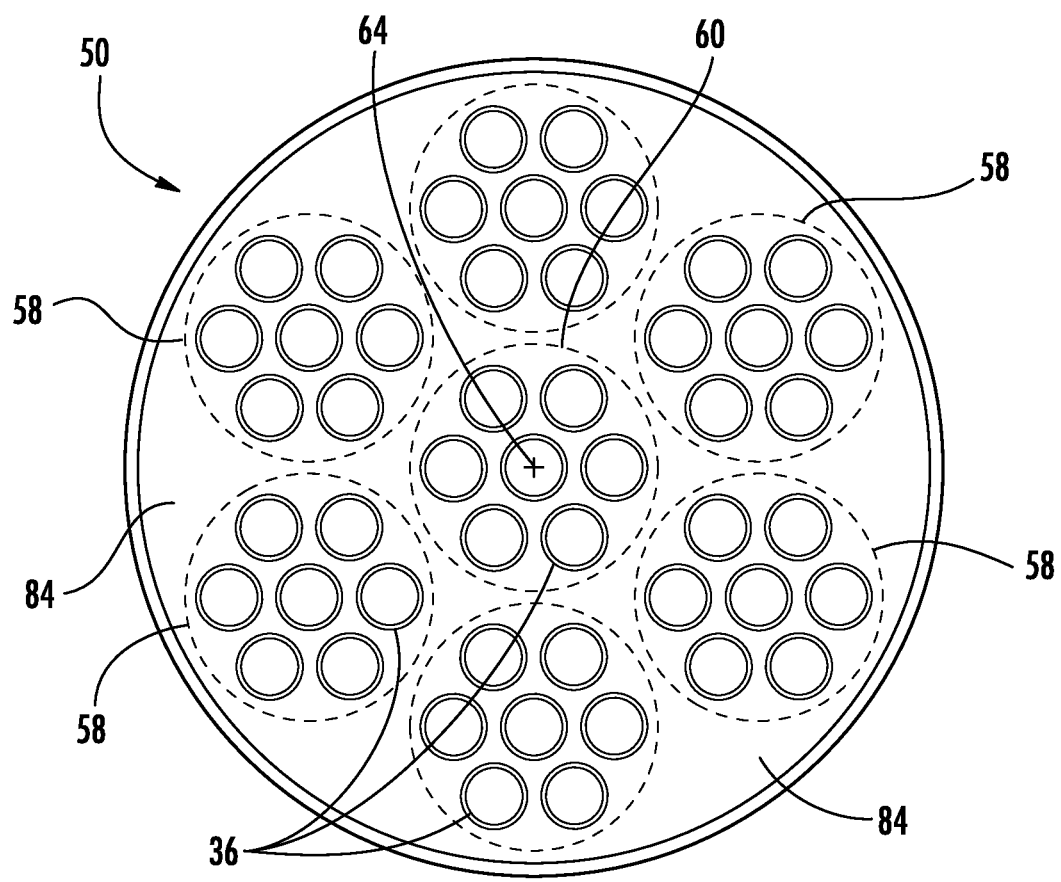
FIG. 4 is an upstream plan view of the cap assembly shown in FIG. 2 according to an alternate embodiment of the present invention.
Figure 5:
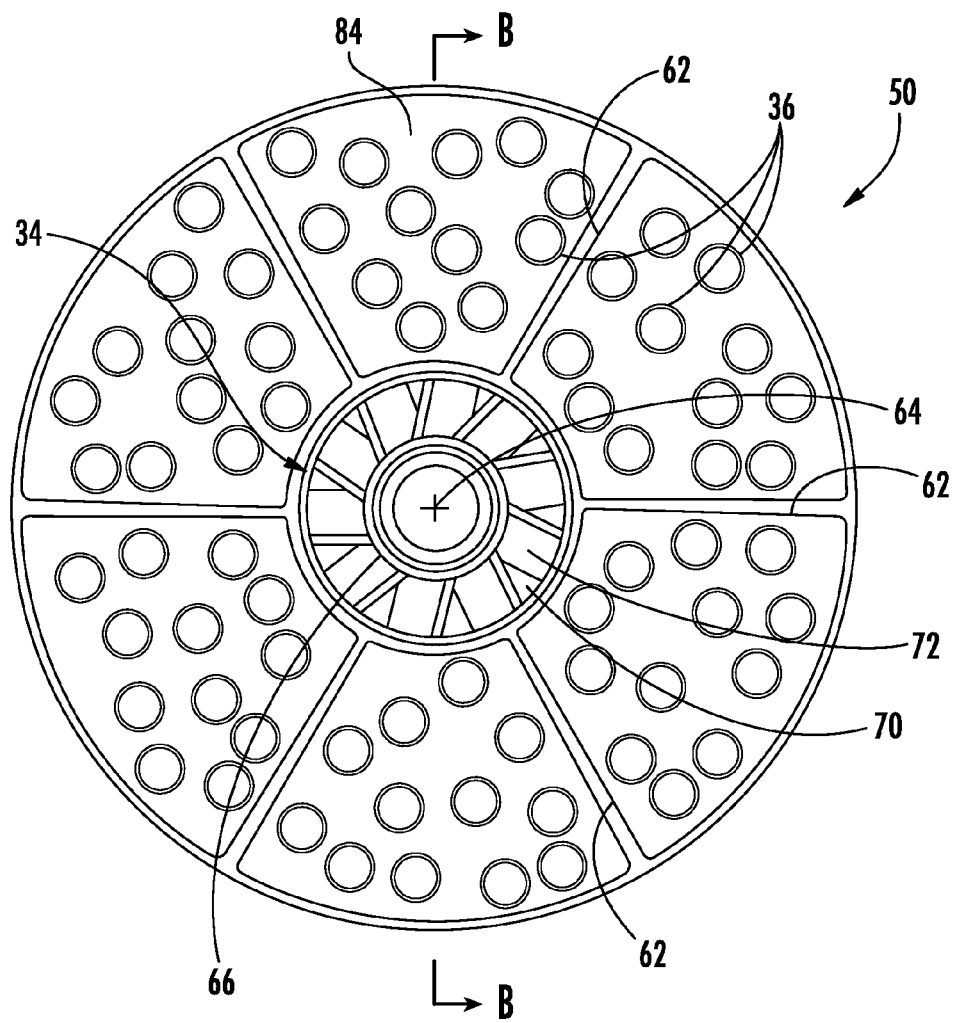
FIG. 5 is an upstream plan view of the cap assembly shown in FIG. 2 according to an alternate embodiment of the present invention.

Although generally shown as cylindrical, the radial cross-section of the fuel nozzles 34 and/or tubes 36 may be any geometric shape, and the present invention is not limited to any particular radial cross-section unless specifically recited in the claims. In addition, various embodiments of the combustor 14 may include different numbers and arrangements of fuel nozzles 34 and/or tubes 36 in the cap assembly 50, and FIGS. 3-5 provide upstream plan views of exemplary arrangements of the fuel nozzles 34 and/or tubes 36 in the cap assembly 50 within the scope of the present invention. As shown in FIG. 3, for example, multiple fuel nozzles 34 may be radially arranged around a single fuel nozzle 34. Alternately, as shown in FIG. 4, the tubes 36 may be radially arranged across the entire cap assembly 50, and the tubes 36 may be divided into various groups to facilitate multiple fueling regimes over the combustor's 14 range of operations. For example, the tubes 36 may be grouped in a plurality of circular tube bundles 58 that circumferentially surround a center tube bundle 60, as shown in FIG. 4. Alternately, as shown in FIG. 5, a plurality of pie-shaped tube bundles 62 may circumferentially surround a single fuel nozzle 34. During base load operations, fuel may be supplied to each fuel nozzle 34 and tube bundle 58, 60, 62 shown in FIGS. 3-5, while fuel flow may be reduced or completely eliminated from the center fuel nozzle 34 or center tube bundle 60 and/or one or more circumferentially arranged fuel nozzles 34 or circular or pie-shaped tube bundles 58, 62 during reduced or turndown operations. One of ordinary skill in the art will readily appreciate multiple other shapes and arrangements for the fuel nozzles 34, tubes 36, and tube bundles 58, 60, 62 from the teachings herein, and the particular shape and arrangement of the fuel nozzles 34, tubes 36, and tube bundles 58, 60, 62 are not limitations of the present invention unless specifically recited in the claims.

Figure 6:
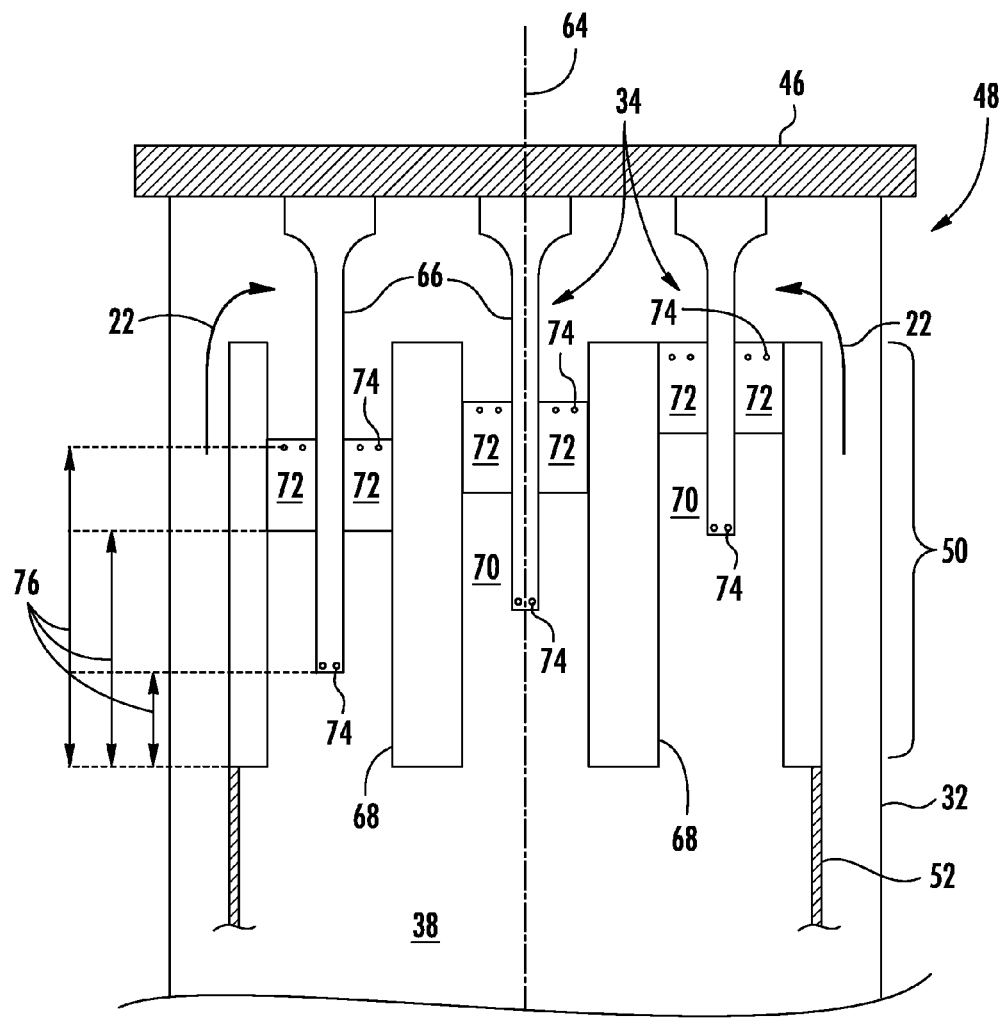
FIG. 6 is a side cross-section view of the head end of the combustor shown in FIG. 3 taken along line A-A according to an embodiment of the present invention.

FIG. 6 provides a side cross-section view of the head end 48 of the combustor 14 shown in FIG. 3 taken along line A-A according to an embodiment of the present invention. As shown in FIGS. 3 and 6, the combustor 14 may include a plurality of fuel nozzles 34 radially arranged around a center fuel nozzle 34 that is substantially aligned with an axial centerline 64 of the combustor 14. Each fuel nozzle 34 may include a center body 66 that extends axially downstream from the end cover 46 and a shroud 68 that circumferentially surrounds at least a portion of the center body 66 to define an annular passage 70 between the center body 66 and the shroud 68. One or more vanes 72 may extend radially between the center body 66 and the shroud 68, and the vanes 72 may be angled or curved to impart swirl to the working fluid 22 flowing through the annular passage 70 between the center body 66 and the shroud 68. The vanes 72 and/or the center body 66 may include one or more fuel ports 74. In this manner, fuel may be supplied through the center body 66 and/or vanes 72, and the fuel ports 74 provide fluid communication for the fuel to flow into the annular passage 70 and mix with the working fluid 22 before the mixture reaches the combustion chamber 38.

When the fuel nozzles 34 are incorporated into the combustor 14, such as the exemplary combustor 14 shown in FIG. 2, the resulting combustion process in the combustion chamber 38 may produce heat release fluctuations that may in turn couple with one or more acoustic modes of the combustor 14, generating combustion instabilities. One specific mechanism that may produce combustion instabilities occurs when the acoustic pulsations driven by the heat release fluctuations cause mass flow fluctuations through the fuel ports 74. For example, the pressure pulses associated with the combustion flames may propagate upstream from the combustion chamber 38 into each annular passage 70. Once the pressure pulses reach the fuel ports 74 and/or vanes 72, the pressure pulses may interfere with the fuel flow through the fuel ports 74 and/or over the vanes 72, creating fluctuations in the fuel-air mixture concentration flowing downstream toward the combustion flame. This fuel/air ratio fluctuation then travels downstream to the flame region where it causes a heat release fluctuation. Provided the resulting heat release fluctuation is approximately in phase with the pressure fluctuations, it will further encourage heat release fluctuations, creating a continuous feedback loop. Conversely, if the resulting heat release fluctuation and the pressure fluctuations are out of phase, destructive interfere will decrease the magnitude of the combustion instability frequency associated with the particular fuel nozzle 34. The combustion instability frequencies associated with the fuel nozzles 34 may in turn either constructively or destructively interfere with one another to increase or decrease the amplitude of the combustion dynamics associated with the particular combustor 14.

The resulting combustion instability frequencies will be a function of the time it takes for the acoustic pressure pulse to reach the fuel port and then the resulting fuel/air ratio disturbance to reach the flame zone. This time is known in the art as convective time, or Tau. The combustion instability frequencies generated by the interaction of the fuel/air ratio fluctuations and the acoustic pressure fluctuation are therefore inversely proportional to the axial distance between the fuel ports 74 and/or the vanes 72 and the combustion chamber 38 (i.e., the end of the fuel nozzles 34 or the end of the shrouds 68). In particular embodiments, these combustion instability frequencies may be adjusted and/or tuned in one or more fuel nozzles 34 to affect the combustion dynamics associated with the individual combustor 14. In the particular embodiment shown in FIGS. 3 and 6, for example, the combustor 14 may include multiple fuel nozzles 34, with a different axial distance 76 between the fuel ports 74 and/or the vanes 72 and the combustion chamber 38 for each fuel nozzle 34. As a result, the combustion instability frequency generated for each fuel nozzle 34 will be slightly different, reducing or precluding constructive interference between the fuel nozzles 34 from increasing the amplitude of the combustion dynamics associated with the particular combustor 14. One of ordinary skill in the art will readily appreciate from the teachings herein that multiple combinations of variations in the axial distances 76 between the fuel ports 74 and/or the vanes 72 and the combustion chamber 38 are possible to achieve a desired combustion instability frequency for each fuel nozzle 34 and/or desired combustion dynamics for the particular combustor 14. For example, in particular embodiments, the axial distances 76 between the fuel ports 74 and/or the vanes 72 and the combustion chamber 38 may be the same or different for some or all of the fuel nozzles 34 in a particular combustor 14, and the present invention is not limited to any particular combination of axial distances 76 unless specifically recited in the claims.

Figure 7:
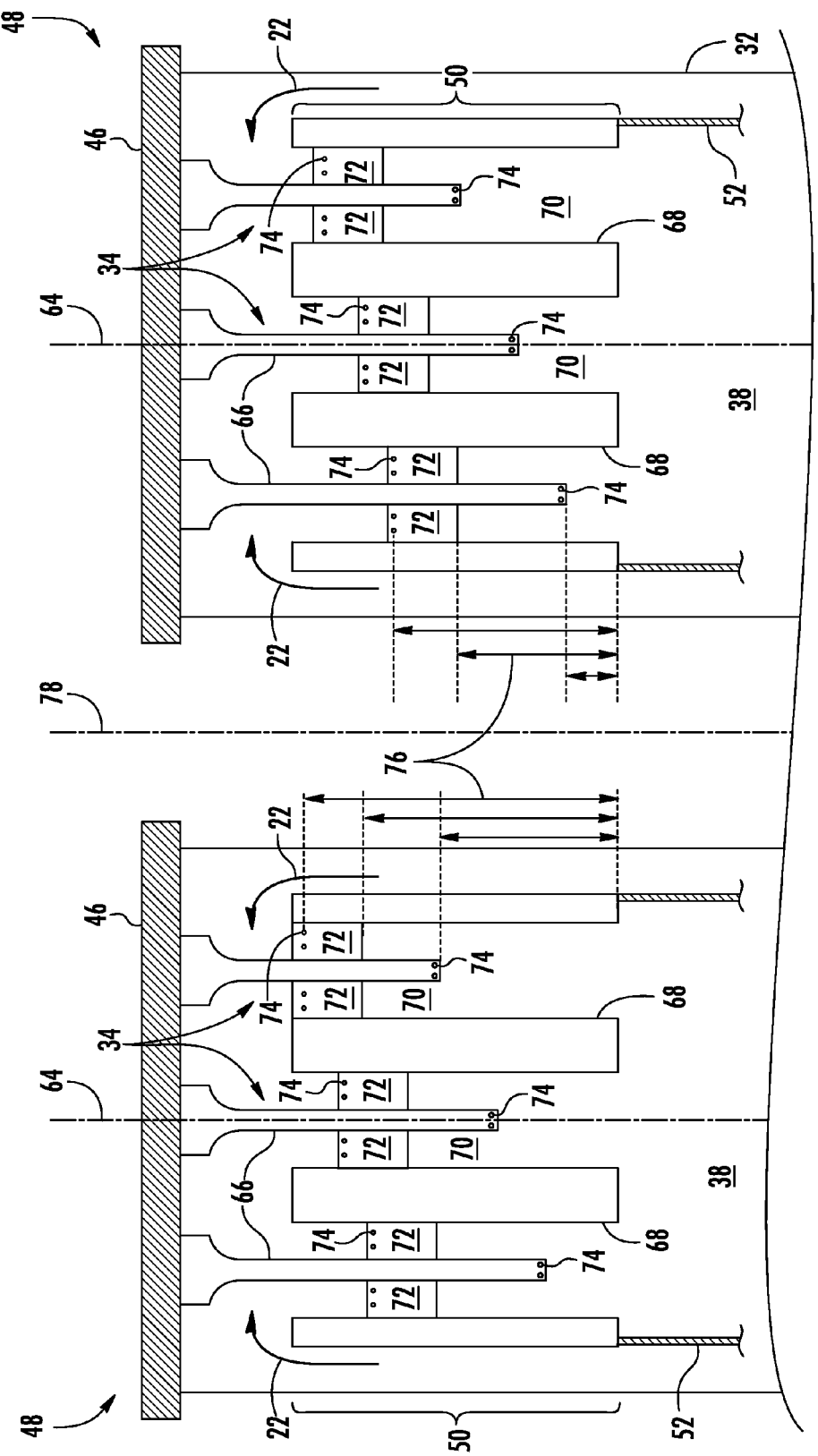
FIG. 7 is a system for reducing combustion dynamics according to a first embodiment of the present invention.

The combustion dynamics associated with multiple combustors 14 incorporated into the gas turbine 10 may in turn either constructively or destructively interfere with one another to increase or decrease the amplitude and/or coherence of the combustion dynamics associated with the gas turbine 10. In particular embodiments, the combustion instability frequencies and/or combustion dynamics associated with one or more combustors 14 may be adjusted and/or tuned to affect the interaction with the combustion dynamics of another combustor 14 and thus the combustion dynamics associated with the gas turbine 10. For example, FIG. 7 provides a system for reducing combustion dynamics and/or coherence of the combustion dynamics according to a first embodiment of the present invention. In the particular embodiment shown in FIG. 7, multiple combustors 14 as shown in FIGS. 3 and 6 have been arranged about an axis 78. The axis 78 may coincide, for example, with the rotor 18 in the gas turbine 10 that connects the compressor section 12 to the turbine section 16, although the present invention is not limited to the particular orientation of the axis 78 or the particular arrangement of the combustors 14 about the axis 78.

As shown in FIG. 7, each combustor 14 includes multiple fuel nozzles 34 with the combustion chamber 38 downstream from the fuel nozzles 34 as previously described with respect to FIGS. 2, 3, and 6. In addition, the system further includes means for producing a combustion instability frequency in one combustor 14 that is different from the combustion instability frequency in the other combustor 14. The function of producing a combustion instability frequency in one combustor 14 that is different from the combustion instability frequency in the other combustor 14 reduces or prevents coherent or constructive interference between the combustion instability frequencies that might increase the amplitude of the combustion dynamics or increase the coherence of the combustion dynamics of two or more combustors 14. The structure for the means may include a difference in one or more of the axial distances 76 between the fuel ports 74 and the combustion chamber 38 and/or the vanes 72 and the combustion chamber 38 between the two combustors 14. In the particular embodiment shown in FIG. 7, for example, each axial distance 76 between the fuel ports 74 and the combustion chamber 38 and between the vanes 72 and the combustion chamber 38 is different between the two combustors 14. As a result, the means produces different combustion instability frequencies in the two combustors 14. One of ordinary skill in the art will readily appreciate from the teachings herein that multiple combinations of variations in the axial distances 76 between the fuel ports 74 and the combustion chamber 38 and/or the vanes 72 and the combustion chamber 38 are possible to produce a combustion instability frequency in one combustor 14 that is different from the combustion instability frequency in the other combustor 14. For example, in particular embodiments, one or more axial distances 76 between the fuel ports 74 and the combustion chamber 38 and/or the vanes 72 and the combustion chamber 38 may be the same or different for one or more of the fuel nozzles 34 in a particular combustor 14 compared to the other combustor 14, as long as the axial distances 76 are not all the same between both combustors 14, and the present invention is not limited to any particular combination of axial distances 76 unless specifically recited in the claims.

Figure 8:
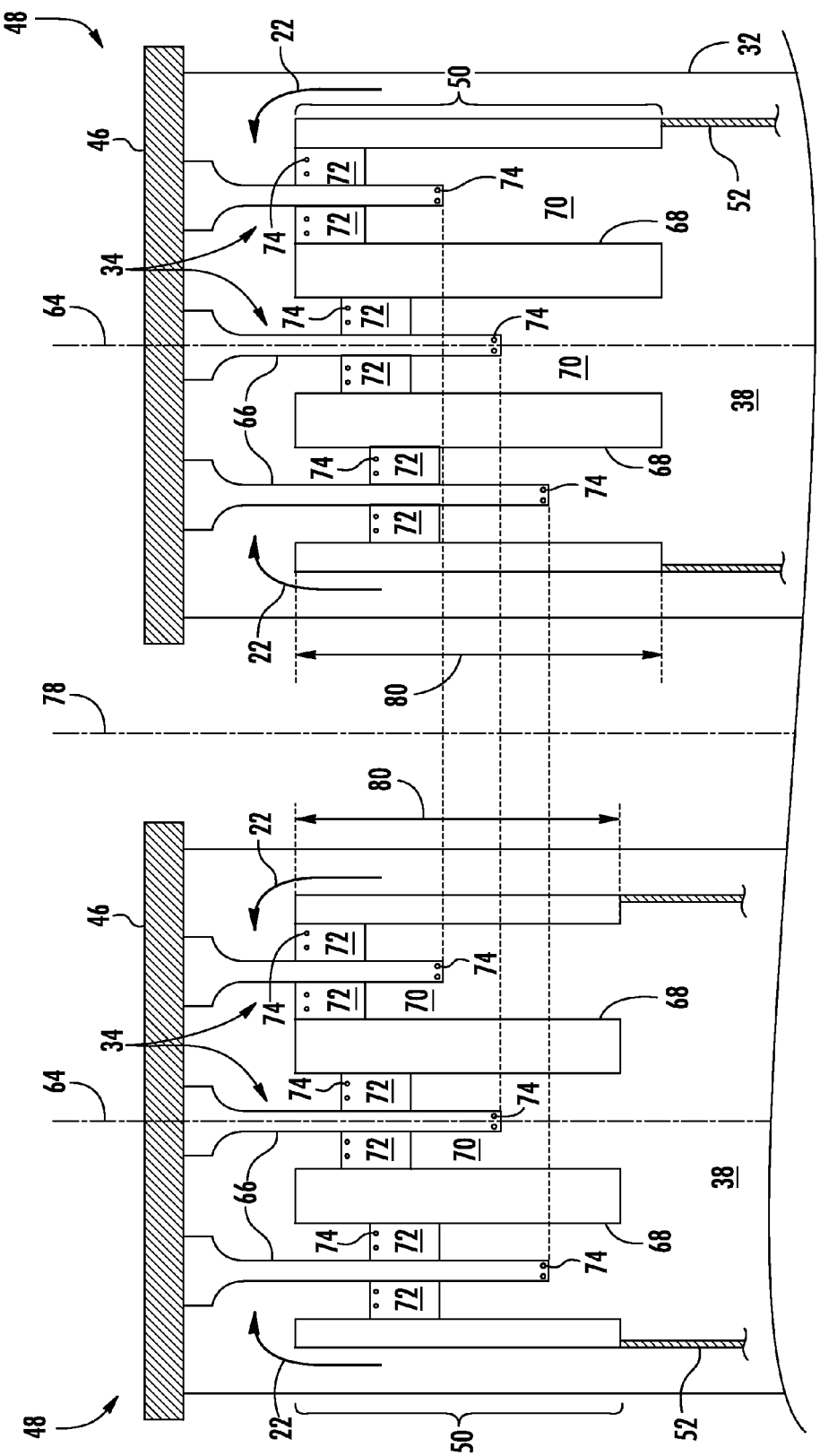
FIG. 8 is a system for reducing combustion dynamics according to a second embodiment of the present invention.

FIG. 8 provides a system for reducing combustion dynamics according to a second embodiment of the present invention. As shown in FIG. 8, each combustor 14 again includes multiple fuel nozzles 34 with the combustion chamber 38 downstream from the fuel nozzles 34 as previously described with respect to FIGS. 2, 3, 6 and 7. In addition, the axial positions of the fuel ports 74 and/or the vanes 72 may be the same or different in each combustor 14. In the specific embodiment shown in FIG. 8, for example, the axial positions of the fuel ports 74 and the vanes 72 are different within the same combustor 14, but the axial positions of the fuel ports 74 and the vanes 72 are repeated in both of the combustors 14.

The embodiment shown in FIG. 8 again includes means for producing a combustion instability frequency or resonant frequency in one combustor 14 that is different from the combustion instability frequency or resonant frequency in the other combustor 14. In this particular embodiment, the structure for the means may include a difference in an axial length 80 of the cap assembly 50 in one combustor 14 compared to the axial length 80 of the cap assembly in the other combustor 14. With the axial positions of the fuel ports 74 and the vanes 72 repeated in both of the combustors 14, the difference in the axial lengths 80 between the two combustors 14 produces a corresponding difference in the axial distances 76 between the fuel ports 74 and the combustion chamber 38 and the vanes 72 and the combustion chamber 38 between the two combustors 14. The difference in axial distances 76 between the two combustors 14 produces a corresponding difference in the combustion instability or resonant frequencies between the two combustors 14. One of ordinary skill in the art will readily appreciate from the teachings herein that multiple combinations of variations in the axial distances 76 between the fuel ports 74 and the combustion chamber 38 and/or the vanes 72 and the combustion chamber 38 are possible to produce a combustion instability or resonant frequency in one combustor 14 that is different from the combustion instability or resonant frequency in the other combustor 14. For example, in particular embodiments, one or more axial distances 76 between the fuel ports 74 and the combustion chamber 38 and/or the vanes 72 and the combustion chamber 38 may be the same or different for one or more of the fuel nozzles 34 in a particular combustor 14 compared to the other combustor 14, and the present invention is not limited to any particular combination of axial distances 76 unless specifically recited in the claims.

Figure 9:
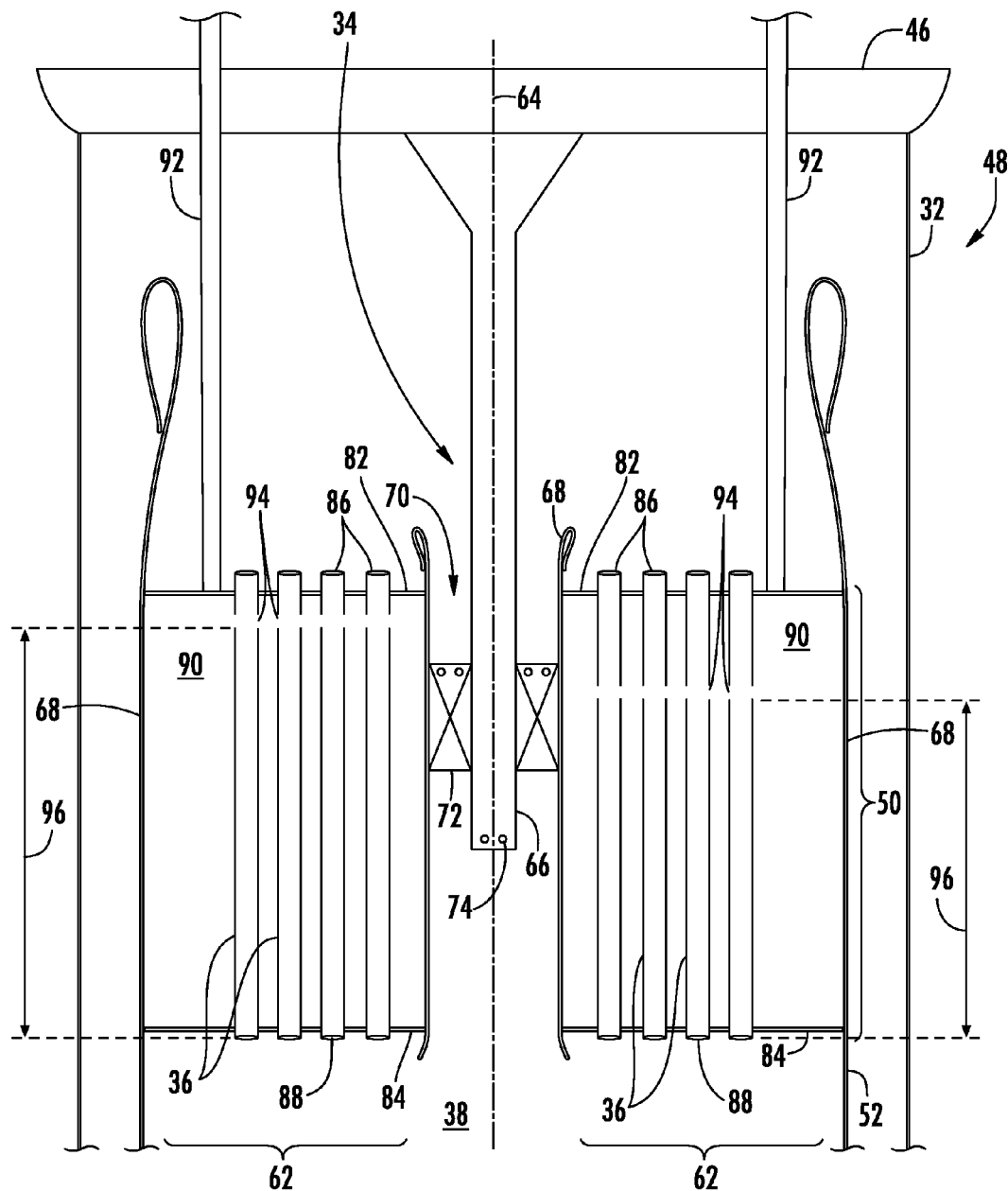
FIG. 9 is a side cross-section view of the head end of the combustor shown in FIG. 5 taken along line B-B according to an embodiment of the present invention.

FIG. 9 provides a side cross-section view of the head end 48 of the combustor 14 shown in FIG. 5 taken along line B-B according to an embodiment of the present invention. As shown, the cap assembly 50 extends radially across at least a portion of the combustor 14 and includes an upstream surface 82 axially separated from a downstream surface 84. The upstream and downstream surfaces 82, 84 may be generally flat or straight and oriented perpendicular to the general flow of the working fluid 22 through the cap assembly 50. In the particular embodiment shown in FIG. 9, the fuel nozzle 34 is again substantially aligned with the axial centerline 64 of the cap assembly 50 and extends through the cap assembly 50 to provide fluid communication through the cap assembly 50 to the combustion chamber 38. The fuel nozzle 34 may include any suitable structure known to one of ordinary skill in the art for mixing fuel with the working fluid 22 prior to entry into the combustion chamber 38, and the present invention is not limited to any particular structure or design unless specifically recited in the claims. For example, as shown in FIG. 9, the fuel nozzle 34 may include the center body 66, shroud 68, annular passage 70, vanes 72, and fuel ports 74 as previously described with respect to the embodiment shown in FIG. 6.

As shown in FIGS. 5 and 9, the tubes 36 may be circumferentially arranged around the fuel nozzle 34 in pie-shaped tube bundles 62 and may extend from the upstream surface 82 through the downstream surface 84 of the cap assembly 50. Each tube 36 generally includes an inlet 86 proximate to the upstream surface 82 and an outlet 88 proximate to the downstream surface 84 to provide fluid communication through the cap assembly 50 and into the combustion chamber 38 downstream from the tubes 36.

As shown in FIG. 9, the upstream and downstream surfaces 82, 84 may at least partially define a fuel plenum 90 inside the cap assembly 50. A fuel conduit 92 may extend from the casing 32 and/or the end cover 46 through the upstream surface 82 to provide fluid communication for fuel to flow into the fuel plenum 90. One or more of the tubes 36 may include a fuel injector 94 that extends through the tubes 36 to provide fluid communication from the fuel plenum 90 into the tubes 36. The fuel injectors 94 may be angled radially, axially, and/or azimuthally to project and/or impart swirl to the fuel flowing through the fuel injectors 94 and into the tubes 36. The working fluid 22 may thus flow into the tube inlets 86, and fuel from the fuel conduit 92 may flow around the tubes 36 in the fuel plenum 90 to provide convective cooling to the tubes 36 before flowing through the fuel injectors 94 and into the tubes 36 to mix with the working fluid 22. The fuel-working fluid mixture may then flow through the tubes 36 and into the combustion chamber 38.

As previously described with respect to the embodiment shown in FIG. 6, when the tubes 36 are incorporated into the combustor 14, such as the exemplary combustor 14 shown in FIG. 2, the resulting combustion process in the combustion chamber 38 may produce heat release fluctuations that may in turn couple with one or more acoustic modes of the combustor 14, generating combustion instabilities. One specific mechanism by which combustion instabilities may be produced occur when the acoustic pulsations driven by the heat release fluctuations travel upstream to the fuel injectors 94 where they may interfere with the fuel flow through the fuel injectors 94 and create fluctuations in the fuel-air mixture concentration flowing downstream toward the combustion flame. This fuel/air ratio fluctuation then travels downstream to the flame region where it can cause a heat release fluctuation. Provided the resulting heat release fluctuation is approximately in-phase with the pressure fluctuations, it will further encourage heat release fluctuations, completing a continuous feedback loop. Conversely, if the resulting heat release fluctuation and the pressure fluctuations are out of phase, destructive interfere will decrease the magnitude of the combustion instability frequency associated with the tubes 36, tube bundles 62, and/or cap assembly 50. The combustion instability frequencies associated with the tubes 36 and/or tube bundles 62 may in turn either constructively or destructively interfere with one another to increase or decrease the amplitude of the combustion dynamics associated with the particular combustor 14.

The resulting combustion instability frequencies will be a function of the time it takes for the acoustic pressure pulse to reach the fuel injector 94 and then the resulting fuel/air ratio disturbance to reach the flame zone. This time is known in the art as convective time, or Tau. The combustion instability frequencies generated by the interaction of the fuel/air ratio fluctuations and the acoustic pressure fluctuation are therefore inversely proportional to the axial distance between the fuel injectors 94 and the combustion chamber 38 (i.e., the tube outlets 88). In particular embodiments, these combustion instability frequencies may be adjusted and/or tuned in one or more tubes 36 and/or tube bundles 62 to affect the combustion dynamics associated with the individual combustor 14. In the particular embodiment shown in FIGS. 5 and 9, for example, the tubes 36 may have a different axial distance 96 between the fuel injectors 94 and the combustion chamber 38 for each tube bundle 62. As a result, the combustion instability frequency for each tube 62 will be slightly different, reducing or precluding constructive interference between the tube bundles 62 from increasing the amplitude of the combustion dynamics associated with the particular combustor 14. One of ordinary skill in the art will readily appreciate from the teachings herein that multiple combinations of variations in the axial distances 96 between the fuel injectors 94 and the combustion chamber 38 are possible to achieve a desired combustion instability frequency for each tube 36 and/or tube bundle 62 and/or desired combustion dynamics for the particular combustor 14. For example, in particular embodiments, the axial distances 96 between the fuel injectors 94 and the combustion chamber 38 may be the same or different for some or all of the tubes 36 and/or tube bundles 62 in a particular combustor 14, and the present invention is not limited to any particular combination of axial distances 96 unless specifically recited in the claims.

Figure 10:
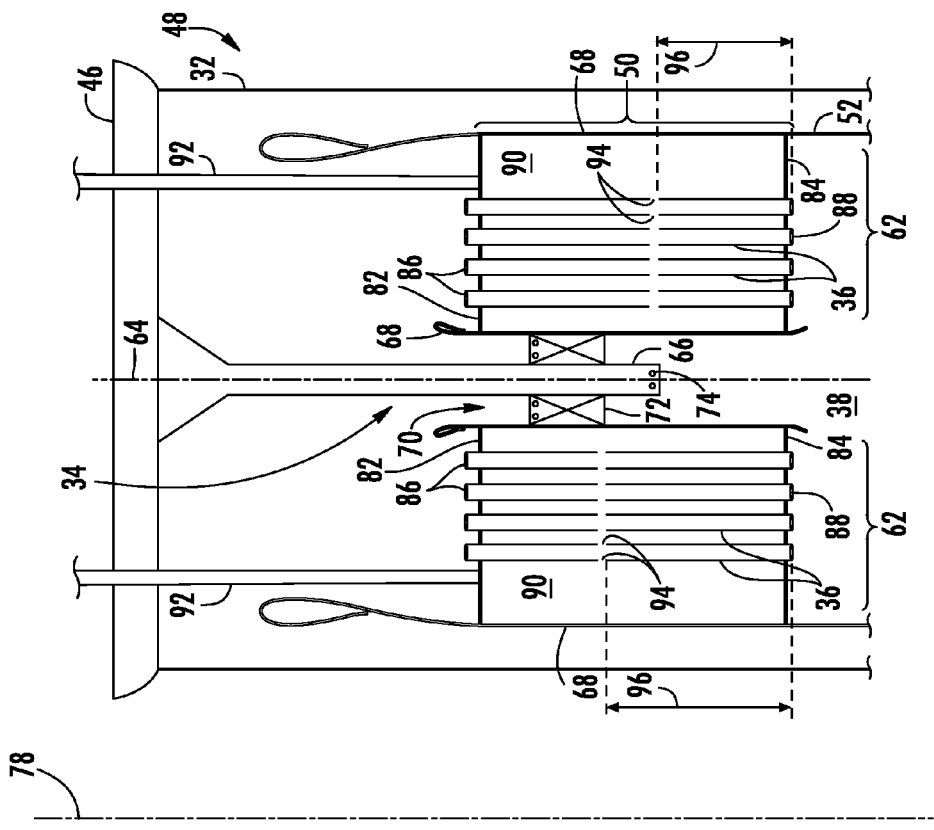
FIG. 10 is a system for reducing combustion dynamics according to a third embodiment of the present invention.
Figure 10:
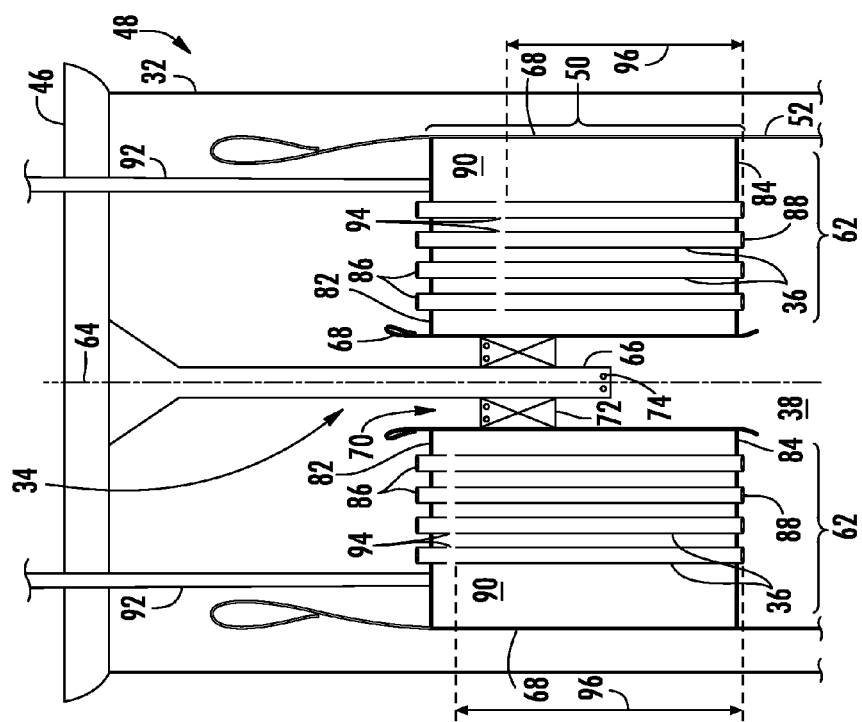

The combustion dynamics associated with multiple combustors 14 incorporated into the gas turbine 10 may in turn either constructively or destructively interfere with one another to increase or decrease the amplitude and/or coherence of the combustion dynamics associated with the gas turbine 10. In particular embodiments, the combustion instability frequencies and/or combustion dynamics associated with one or more combustors 14 may be adjusted and/or tuned to affect the interaction with the combustion dynamics of another combustor 14 and thus the combustion dynamics associated with the gas turbine 10. For example, FIG. 10 provides a system for reducing combustion dynamics according to a third embodiment of the present invention. In the particular embodiment shown in FIG. 10, multiple combustors 14 as shown in FIGS. 5 and 9 have been arranged about an axis 100. The axis 100 may coincide, for example, with the rotor 18 in the gas turbine 10 that connects the compressor section 12 to the turbine section 16, although the present invention is not limited to the particular orientation of the axis 100 or the particular arrangement of the combustors 14 about the axis 100.

As shown in FIG. 10, each combustor 14 includes multiple tubes 36 arranged in pie-shaped tube bundles 62 that circumferentially surround the fuel nozzle 34, and the combustion chamber 38 is downstream from the tubes 36, tube bundles 62, and fuel nozzle 34 as previously described with respect to FIGS. 2, 5, and 9. In addition, the system further includes means for producing a combustion instability frequency in one combustor 14 that is different from the combustion instability frequency in the other combustor 14. The structure for the means may include a difference in one or more of the axial distances 96 between the fuel injectors 94 and the combustion chamber 38 between the two combustors 14. In the particular embodiment shown in FIG. 10, for example, the axial distance 96 between the fuel injectors 94 and the combustion chamber 38 for each tube bundle 62 is different between the two combustors 14. As a result, the means produces different combustion instability frequencies in the two combustors 14. One of ordinary skill in the art will readily appreciate from the teachings herein that multiple combinations of variations in the axial distances 96 between the fuel injectors 94 and the combustion chamber 38 are possible to produce a combustion instability frequency in one combustor 14 that is different from the combustion instability frequency in the other combustor 14. For example, in particular embodiments, one or more axial distances 96 between the fuel injectors 94 and the combustion chamber 38 may be the same or different for one or more of the tubes 36 and/or tube bundles 62 in a particular combustor 14 compared to the other combustor 14, as long as the axial distances 96 are not all the same between both combustors 14, and the present invention is not limited to any particular combination of axial distances 96 unless specifically recited in the claims.

Figure 11:
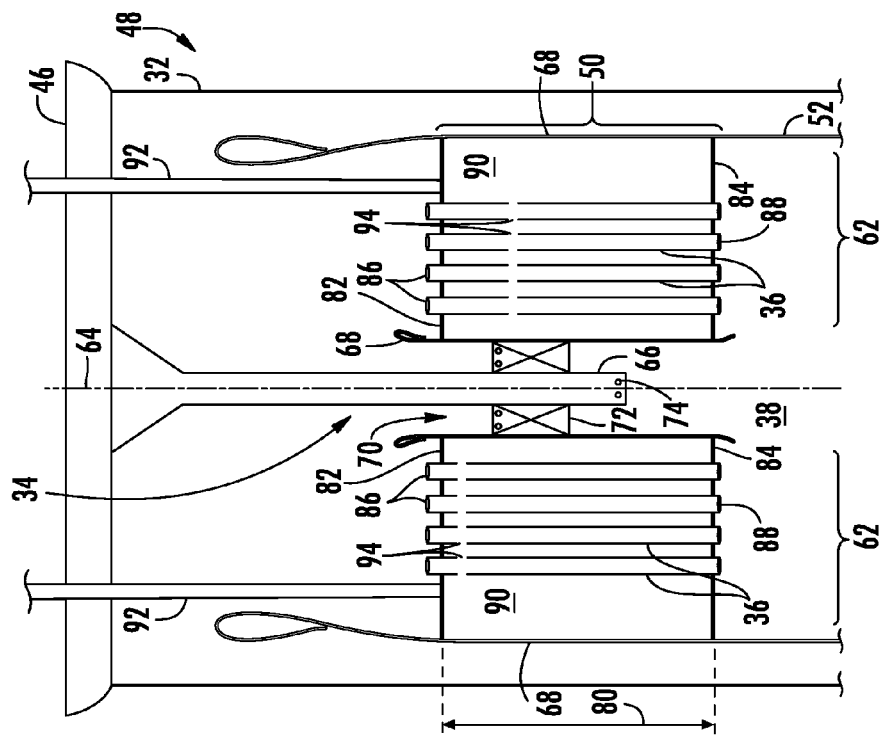
FIG. 11 is a system for reducing combustion dynamics according to a fourth embodiment of the present invention.
Figure 11:
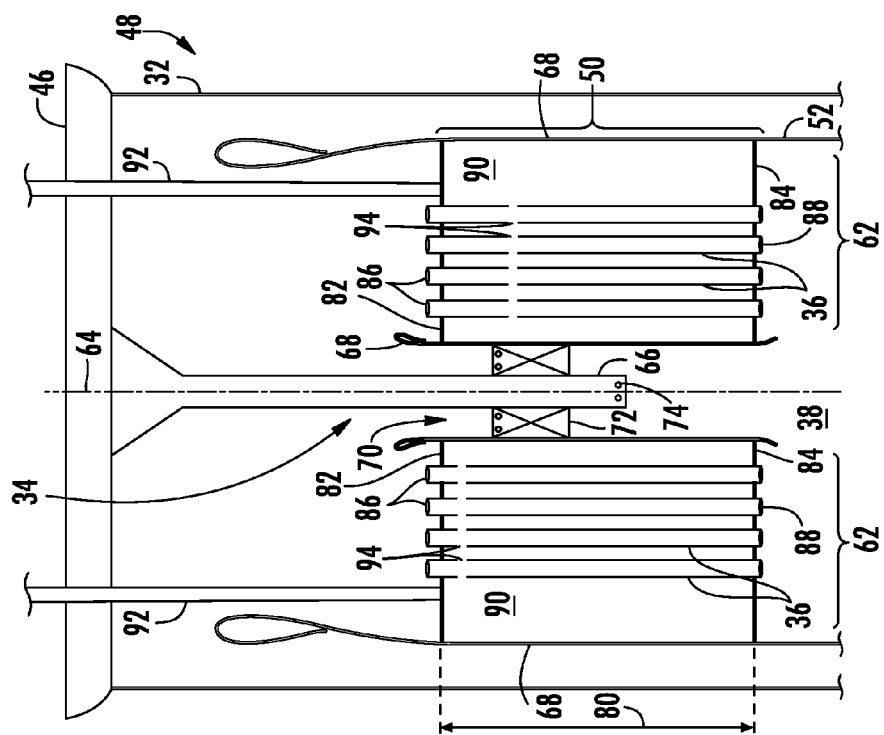

FIG. 11 provides a system for reducing combustion dynamics according to a fourth embodiment of the present invention. As shown in FIG. 11, each combustor 14 again includes multiple tubes 36 arranged in pie-shaped tube bundles 62 that circumferentially surround the fuel nozzle 34, and the combustion chamber 38 is downstream from the tubes 36, tube bundles 62, and fuel nozzle 34 as previously described with respect to FIGS. 2, 5, 9, and 10. In addition, the axial positions of the fuel injectors 94 may be the same or different in each combustor 14. In the specific embodiment shown in FIG. 11, for example, the axial positions of the fuel injectors 94 are different for each tube bundle 62 within the same combustor 14, but the axial positions of the fuel injectors 94 for each tube bundle 62 are repeated in both of the combustors 14.

The embodiment shown in FIG. 11 again includes means for producing a combustion instability or resonant frequency in one combustor 14 that is different from the combustion instability or resonant frequency in the other combustor 14. As with the previous embodiment described and illustrated in FIG. 8, the structure for the means may include a difference in the axial length 80 of the cap assembly 50 in one combustor 14 compared to the axial length 80 of the cap assembly in the other combustor 14. With the axial positions of the fuel injectors 94 repeated in both of the combustors 14, the difference in the axial lengths 80 between the two combustors 14 produces a corresponding difference in the axial distances 96 between the fuel injectors 94 and the combustion chamber 38 between the two combustors 14. The difference in axial distances 96 between the two combustors 14 produces a corresponding difference in the combustion instability or resonant frequencies between the two combustors 14. One of ordinary skill in the art will readily appreciate from the teachings herein that multiple combinations of variations in the axial distances 96 between the fuel injectors 94 and the combustion chamber 38 are possible to produce a combustion instability or resonant frequency in one combustor 14 that is different from the combustion instability or resonant frequency in the other combustor 14. For example, in particular embodiments, one or more axial distances 96 between the fuel injectors 94 and the combustion chamber 38 may be the same or different for one or more of the tubes 36 and/or tube bundles 62 in a particular combustor 14 compared to the other combustor 14, and the present invention is not limited to any particular combination of axial distances 96 unless specifically recited in the claims.

Figure 12:
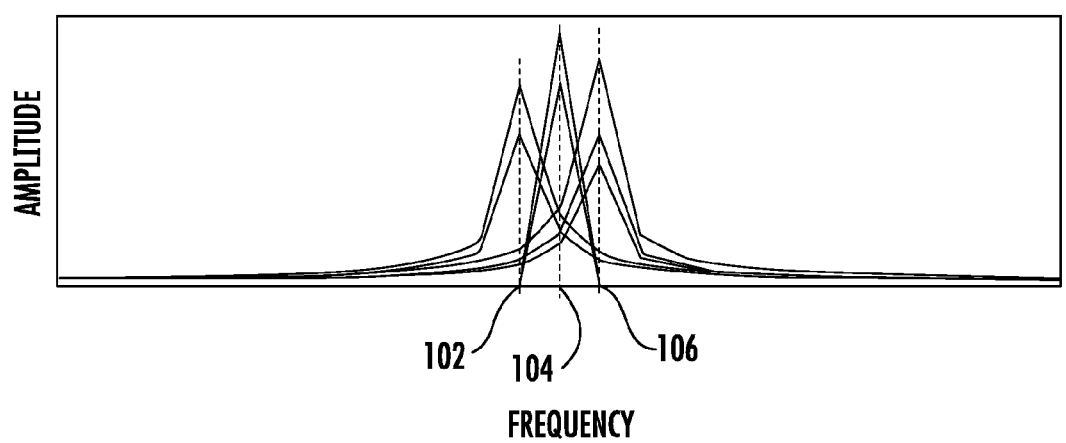
FIG. 12 is an exemplary graph of combustor dynamics according to various embodiments of the present invention.

FIG. 12 provides an exemplary graph of combustor dynamics according to various embodiments of the present invention. The horizontal axis represents a range of combustion instability or resonant frequencies, and the vertical axis represents a range of amplitudes. The system depicted in FIG. 12 may include three or more combustors 14 incorporated into the gas turbine 10 or other turbo-machine. Using the means for producing a combustion instability frequency in one combustor 14 that is different from the combustion instability frequency in the other combustor 14, each combustor 14 may be adjusted or tuned to achieve a desired combustion instability frequency or combustion dynamics. As shown in FIG. 12, for example, a first group of the combustors 14 may be adjusted and/or tuned to achieve a first combustion instability frequency 102, a second group of the combustors 14 may be adjusted and/or tuned to achieve a second combustion instability frequency 104, and a third group of the combustors 14 may be adjusted and/or tuned to achieve a third combustion instability frequency 106. The first, second, and third combustion instability frequencies 102, 104, 106 are slightly different from one another and therefore slightly out of phase with one another. As a result, the combustion instability frequencies 102, 104, 106 associated with the combustors 14 cannot coherently or constructively interfere with one another, reducing or preventing an increase in the combustion dynamics and/or reducing the ability of the combustion system to drive sympathetic vibrations in the downstream turbine section 16.

One of ordinary skill in the art will readily appreciate from the teachings herein that the various structures described and illustrated with respect to FIGS. 1-11 may provide one or more methods for reducing combustion dynamics and/or reducing the coherence of the combustion dynamics for two or more combustors 14. The methods may include, for example, flowing the working fluid 22 and fuel through one or more fuel nozzles 34, tubes 36, and/or tube bundles 62 into the combustion chambers 38 of multiple combustors 14. In particular embodiments, the method may include varying one or more of the axial distances 76 between the fuel ports 74 and the combustion chamber 38 and/or the vanes 72 and the combustion chamber 38, as long as the axial distances 76 are not all the same between all of the combustors 14, to produce a combustion instability frequency in one combustor 14 that is different from the combustion instability frequency in the other combustors 14. In other particular embodiments, the method may include varying one or more of the axial distances 96 between the fuel injectors 94 and the combustion chamber 38, as long as the axial distances 96 are not all the same between all of the combustors 14, to produce a combustion instability frequency in one combustor 14 that is different from the combustion instability frequency in the other combustor 14. In still further particular embodiments, the method may include varying one or more of the axial lengths 80 of the cap assembly 50, as long as the axial lengths 80 are not all the same between all combustors 14, to produce a combustion instability frequency in one combustor 14 that is different from the combustion instability frequency in the other combustor 14.

The various embodiments described and illustrated with respect to FIGS. 1-12 may provide one or more of the following advantages over existing combustors 14. Specifically, the different axial distances 76, 96 and/or axial lengths 80, alone or in various combinations, may decouple the combustion instability frequencies of the combustion dynamics. As a result, the various embodiments described herein may enhance thermodynamic efficiency, promote flame stability, and/or reduce undesirable emissions over a wide range of operating levels.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A gas turbine, comprising:
   a. a plurality of combustors annularly arranged about an axial centerline of the gas turbine, the plurality of combustors including a first combustor and a second combustor;
   b. wherein the first combustor comprises a plurality of bundled tube fuel nozzles annularly arranged about a centerline of the first combustor, each bundled tube fuel nozzle including a fuel plenum and a plurality of tubes which extend therethrough, each tube having an inlet upstream from the fuel plenum, an outlet downstream from the fuel plenum and a fuel injector which provides for fluid communication between the fuel plenum and the tube, the fuel injector being disposed at a first axial distance from the tube outlet, and each tube having the same first axial distance;
   c. wherein the second combustor comprises a plurality of bundled tube fuel nozzles annularly arranged around a centerline of the second combustor, each bundled tube fuel nozzle including a fuel plenum and a plurality of tubes which extend therethrough, each tube having an inlet upstream from the fuel plenum, an outlet downstream from the fuel plenum and a fuel injector which provides for fluid communication between the fuel plenum and the tube, the fuel injector being disposed at a first axial distance from the tube outlet, and each tube having the same first axial distance; and
   d. wherein the first axial distance of one of the plurality of bundled tube fuel nozzles of the first combustor is different than the first axial distance of one of the plurality of bundled tube fuel nozzles of the second combustor.

2. The gas turbine as in claim 1, wherein the plurality of bundled tube fuel nozzles of the first combustor includes a first bundled tube fuel nozzle and a second bundled tube fuel nozzle, wherein the first axial distance of the first bundled tube fuel nozzle is different from the first axial distance of the second bundled tube fuel nozzle.

3. The gas turbine as in claim 1, wherein the plurality of bundled tube fuel nozzles of the second combustor includes a first bundled tube fuel nozzle and a second bundled tube fuel nozzle, wherein the first axial distance of the first bundled tube fuel nozzle is different from the first axial distance of the second bundled tube fuel nozzle.

4. The gas turbine as in claim 1, wherein each of the first and second combustors include a center fuel nozzle circumferentially surrounded by the corresponding plurality of bundled tube fuel nozzles.

5. The gas turbine as in claim 4, wherein each center fuel nozzle is a bundled tube fuel nozzle.

6. The gas turbine as in claim 4, wherein each center fuel nozzle of the first and second combustors includes a center body, a shroud which extends around a portion of the center body and a plurality of vanes which extend from the center body to the shroud, the shroud defining an annular passage therebetween.

7. The gas turbine as in claim 6, wherein the center fuel nozzle of the first combustor includes a first fuel port through at least one of the plurality of vanes at a first axial distance from a combustion chamber defined within the first combustor, a second fuel port through the center body proximate to a tip portion of the center body at a second axial distance from the combustion chamber, and the plurality of vanes are at a third axial distance from the combustion chamber.

8. The gas turbine as in claim 7, wherein the center fuel nozzle of the second combustor includes a first fuel port through at least one of the plurality of vanes at a first axial distance from a combustion chamber defined within the second combustor, a second fuel port through the center body proximate to a tip portion of the center body at a second axial distance from the combustion chamber, and the plurality of vanes are at a third axial distance from the combustion chamber.

9. The gas turbine as in claim 8, wherein the first axial distance of the center fuel nozzle of the first combustor is different from the first axial distance of the center fuel nozzle of the second combustor.

10. The gas turbine as in claim 8, wherein the second axial distance of the center fuel nozzle of the first combustor is different from the second axial distance of the center fuel nozzle of the second combustor.

11. The gas turbine as in claim 8, wherein the third axial distance of the center fuel nozzle of the first combustor is different from the third axial distance of the center fuel nozzle of the second combustor.

12. The gas turbine as in claim 8, wherein the first and second combustors each include a cap assembly that circumferentially surrounds the plurality of bundled tube fuel nozzles, wherein each cap assembly has an axial length, wherein the axial length of the cap assembly in the first combustor is different than the axial length of the cap assembly in the second combustor.

13. A combustor, comprising:
   a. a first bundled tube fuel nozzle and a second bundled tube fuel nozzle arranged about a centerline of the combustor and extending axially within the combustor;
   b. wherein the first bundled tube fuel nozzle includes a fuel plenum and a plurality of axially extending tubes which extend therethrough, each tube having an inlet upstream from the fuel plenum, an outlet downstream from the fuel plenum and a fuel injector which provides for fluid communication between the fuel plenum and the tube, the fuel injector being disposed at a first axial distance from the tube outlet, and each tube having the same first axial distance;
   c. wherein the second bundled tube fuel nozzle includes a fuel plenum and a plurality of axially extending tubes which extend therethrough, each tube having an inlet upstream from the fuel plenum, an outlet downstream from the fuel plenum and a fuel injector which provides for fluid communication between the fuel plenum and the tube, the fuel injector being disposed at a first axial distance from the tube outlet, and each tube having the same first axial distance;
   d. wherein the first axial distance of the first bundled tube fuel nozzle is different from the first axial distance of the second bundled tube fuel nozzle.

14. The combustor as in claim 13, wherein the combustor includes a center fuel nozzle circumferentially surrounded by the first and second bundled tube fuel nozzles.

15. The combustor as in claim 14, wherein the center fuel nozzle is a bundled tube fuel nozzle.

16. The combustor as in claim 14, wherein the center fuel nozzle includes a center body, a shroud which extends around a portion of the center body and a plurality of vanes which extend from the center body to the shroud, the shroud defining an annular passage therebetween.

17. The combustor as in claim 16, wherein the center fuel nozzle includes a first fuel port through at least one of the plurality of vanes at a first axial distance from a combustion chamber defined within the first combustor, a second fuel port through the center body proximate to a tip portion of the center body at a second axial distance from the combustion chamber, and the plurality of vanes are at a third axial distance from the combustion chamber.

18. The combustor as in claim 17, wherein the first axial distance of the center fuel nozzle is different from the first axial distance of at least one of the first bundled tube fuel nozzle and the second bundled tube fuel nozzle.

19. The combustor as in claim 17, wherein the second axial distance of the center fuel nozzle is different from the first axial distance of at least one of the first bundled tube fuel nozzle and the second bundled tube fuel nozzle.

20. The combustor as in claim 17, wherein the third axial distance of the center fuel nozzle is different from the first axial distance of at least one of the first bundled tube fuel nozzle and the second bundled tube fuel nozzle.

* * * * *